(12) United States Patent
Yang et al.

(10) Patent No.: US 11,731,102 B1
(45) Date of Patent: Aug. 22, 2023

(54) PURIFICATION MATERIAL FOR RARE EARTH METAL OR RARE EARTH ALLOY AND PREPARATION METHOD THEREOF AND PURIFICATION METHOD FOR RARE EARTH METAL OR RARE EARTH ALLOY

(71) Applicant: Ganzhou Chenguang Rare Earths New Material Co., Ltd., Ganzhou (CN)

(72) Inventors: Shaohua Yang, Ganzhou (CN); Hui Li, Ganzhou (CN); Ping Huang, Ganzhou (CN); Fangsong He, Ganzhou (CN); Yao Xie, Ganzhou (CN); Guangdong Wu, Ganzhou (CN); Kangwei Xie, Ganzhou (CN); Guowen Huang, Ganzhou (CN); Senlin Ouyang, Ganzhou (CN)

(73) Assignee: GANZHOU CHENGUANG RARE EARTHS NEW MATERIAL CO., LTD., Ganzhou (CN)

( * ) Notice: Subject to any disclaimer, the term of this patent is extended or adjusted under 35 U.S.C. 154(b) by 0 days.

(21) Appl. No.: 17/955,289

(22) Filed: Sep. 28, 2022

(30) Foreign Application Priority Data

Jun. 13, 2022 (CN) .......................... 202210662177.2

(51) Int. Cl.
*B01J 20/06* (2006.01)
*B01J 20/02* (2006.01)
*B01J 20/04* (2006.01)
*C22B 9/02* (2006.01)
*B01J 20/30* (2006.01)

(52) U.S. Cl.
CPC .......... *B01J 20/06* (2013.01); *B01J 20/0207* (2013.01); *B01J 20/0218* (2013.01); *B01J 20/041* (2013.01); *B01J 20/043* (2013.01); *B01J 20/3007* (2013.01); *B01J 20/3042* (2013.01); *B01J 20/3078* (2013.01); *C22B 9/023* (2013.01)

(58) Field of Classification Search
CPC .. C22B 3/22; C22B 34/36; C22B 9/02; C22B 9/023; C22B 9/14; B01J 20/0207; B01J 20/0218; B01J 20/3042; B01J 20/3078
USPC .......................................................... 75/407
See application file for complete search history.

(56) References Cited

U.S. PATENT DOCUMENTS 3,288,593 A * 11/1966 Smith, Jr. ............. H01J 37/305
75/622
2012/0219735 A1 8/2012 Bakker et al.

* cited by examiner

*Primary Examiner* — Sally A Merkling
*Assistant Examiner* — Ricardo D Morales
(74) *Attorney, Agent, or Firm* — Fox Rothschild LLP; Carol E. Thorstad-Forsyth

(57) ABSTRACT

The present disclosure provides a purification material for a rare earth metal or rare earth alloy and a preparation method thereof and a purification method for a rare earth metal or rare earth alloy. The purification material includes the following raw materials in mass percentage: 30% to 45% of a tungsten powder, 30% to 50% of a rare earth oxide, 5% to 10% of zirconia, 10% to 15% of a binder, and 1% to 5% of a rare earth hydride.

9 Claims, 2 Drawing Sheets

PURIFICATION MATERIAL FOR RARE EARTH METAL OR RARE EARTH ALLOY AND PREPARATION METHOD THEREOF AND PURIFICATION METHOD FOR RARE EARTH METAL OR RARE EARTH ALLOY

CROSS REFERENCE TO RELATED APPLICATION

This patent application claims the benefit and priority of the Chinese Patent Application No. 202210662177.2, entitled "Purification material for rare earth metal or rare earth alloy and preparation method thereof and purification method for rare earth metal or rare earth alloy" filed on Jun. 13, 2022, the disclosure of which is incorporated by reference herein in its entirety as part of the present application.

TECHNICAL FIELD

The present disclosure refers to the technical field of rare earth purification, and in particular to a purification material for a rare earth metal or rare earth alloy and a preparation method thereof and a purification method for a rare earth metal or rare earth alloy.

BACKGROUND ART

Rare earths are synonymous with a class of elements discovered at the end of the 18$^{th}$ century, representing 17 metal elements including lanthanide elements, scandium and yttrium in the periodic table. Due to the unique physical and chemical properties, the rare earths have attracted an extensive attention and are widely used in various fields including metallurgy, military industry, machinery, transportation (such as airplanes and automobiles) and new materials.

The rare earth metals or rare earth alloys are mainly produced by molten salt electrolysis and thermal reduction. However, neither of these two production processes produces the rare earth metals or rare earth alloys in a high purity. In the case where a certain purity of a metal is not reached, the characteristics of the metal are generally masked by the impurities, and thus trace impurities or even ultra-trace impurities may affect the performances of metals. Therefore, a relatively low purity limits the application performances of the rare earth metals or rare earth alloys in subsequent reprocessing.

The high-purity rare earth metals are comprehensive products of various modern high-techs. Especially with the development of semiconductor, aerospace and radio technologies, requirements for the purity of rare earth metals are becoming increasingly higher, which have greatly promoted the development of the high-purity rare earth metal production in turn. The main impurities in rare earth metals or rare earth alloys are the inclusions of carbon, oxygen, nitrogen, iron and some fluorides. In order to remove impurities in rare earth metals or rare earth alloys, it is necessary to purify the rare earth metals or rare earth alloys. At present, methods for purification treatment include zone smelting, vacuum distillation, solid-state electromigration and electrolytic refining. However, these methods suffer from the problems of a long treatment time and a low efficiency.

SUMMARY

In view of this, an objective of the present disclosure is to provide a purification material for a rare earth metal or rare earth alloy and a preparation method thereof and a purification method for a rare earth metal or rare earth alloy. The purification material for a rare earth metal or rare earth alloy according to the present disclosure may efficiently purify the rare earth metals or rare earth alloys to remove impurities with a short treatment time and a high efficiency.

To achieve the objective stated above, the present disclosure provides the following technical solutions.

The present disclosure provides a purification material for a rare earth metal or rare earth alloy, including the following raw materials in mass percentage:

30% to 45% of a tungsten powder, 30% to 50% of a rare earth oxide, 5% to 10% of zirconia, 10% to 15% of a binder, and 1% to 5% of a rare earth hydride.

In some embodiments, the binder is lithium oxide and/or lithium carbonate.

In some embodiments, the rare earth oxide includes one or more selected from the group consisting of lanthanum oxide, cerium oxide, praseodymium oxide, neodymium oxide and yttrium oxide.

In some embodiments, the rare earth hydride includes one or more selected from the group consisting of lanthanum hydride, cerium hydride, praseodymium hydride, neodymium hydride and yttrium hydride.

The present disclosure further provides a method for preparing the purification material for a rare earth metal or rare earth alloy according to the technical solutions above, including:

mixing the raw materials and then subjecting to molding and calcining in sequence to obtain the purification material for a rare earth metal or rare earth alloy.

In some embodiments, the molding is conducted at a pressure within a range of 10 MPa to 100 MPa for 30 min to 60 min.

In some embodiments, the calcining is conducted at a temperature within a range of 1,600° C. to 1,800° C. for 1 h to 3 h in a protective atmosphere with a heating rate within a range of 15° C./min to 30° C./min.

The present disclosure further provides a method for purifying a rare earth metal or rare earth alloy, including:

flowing a rare earth metal or rare earth alloy to be purified through a purification material for filtration purification to obtain a purified rare earth metal or rare earth alloy, where the purification material is the purification material for a rare earth metal or rare earth alloy according to the technical solutions above or the purification material for a rare earth metal or rare earth alloy prepared by the method according to the technical solutions above.

In some embodiments, the filtration purification is conducted 1 to 5 times.

In some embodiments, the filtration purification is conducted at a temperature within a range of 900° C. to 1,200° C. in a protective atmosphere.

The present disclosure provides a purification material for a rare earth metal or rare earth alloy, including the following raw materials in mass percentage: 30% to 45% of a tungsten powder, 30% to 50% of a rare earth oxide, 5% to 10% of zirconia, 10% to 15% of a binder, and 1% to 5% of a rare earth hydride. In the present disclosure, the impurities in the rare earth metals or the rare earth alloys are mainly electrolytes (such as complexes of rare earth fluoride-lithium fluoride, specifically $NdF_3$—LiF, $NdF_3$—$PrF_3$—LiF, $HoF_3$—LiF, $DyF_3$—LiF and $GdF_3$—LiF), rare earth oxides (such as neodymium oxide, praseodymium oxide, dysprosium oxide, holmium oxide, gadolinium oxide, lanthanum oxide and cerium oxide) and rare earth carbides (such as lanthanum carbide, neodymium carbide, praseo-dymium carbide, holmium carbide, gadolinium carbide, cerium carbide and dysprosium carbide). Most of these impurities are admixed into the rare earth metals or the rare earth alloys and do not fuse with the rare earth metals or rare earth alloys. The purification material according to the present disclosure has the functions of adsorption and micropore filtration, and thus may remove impurities from the rare earth metals or rare earth alloys via adsorption and isolation.

The present disclosure further provides a method for purifying a rare earth metal or rare earth alloy, including flowing a rare earth metal or rare earth alloy to be purified through a purification material for filtration purification to obtain a purified rare earth metal or a purified rare earth alloy, where the purification material is the purification material for a rare earth metal or rare earth alloy according to the technical solutions above. The purification method as provided in the present disclosure has a simple operation, a short period and a high efficiency.

DETAILED DESCRIPTION OF THE EMBODIMENTS

Figure 1:
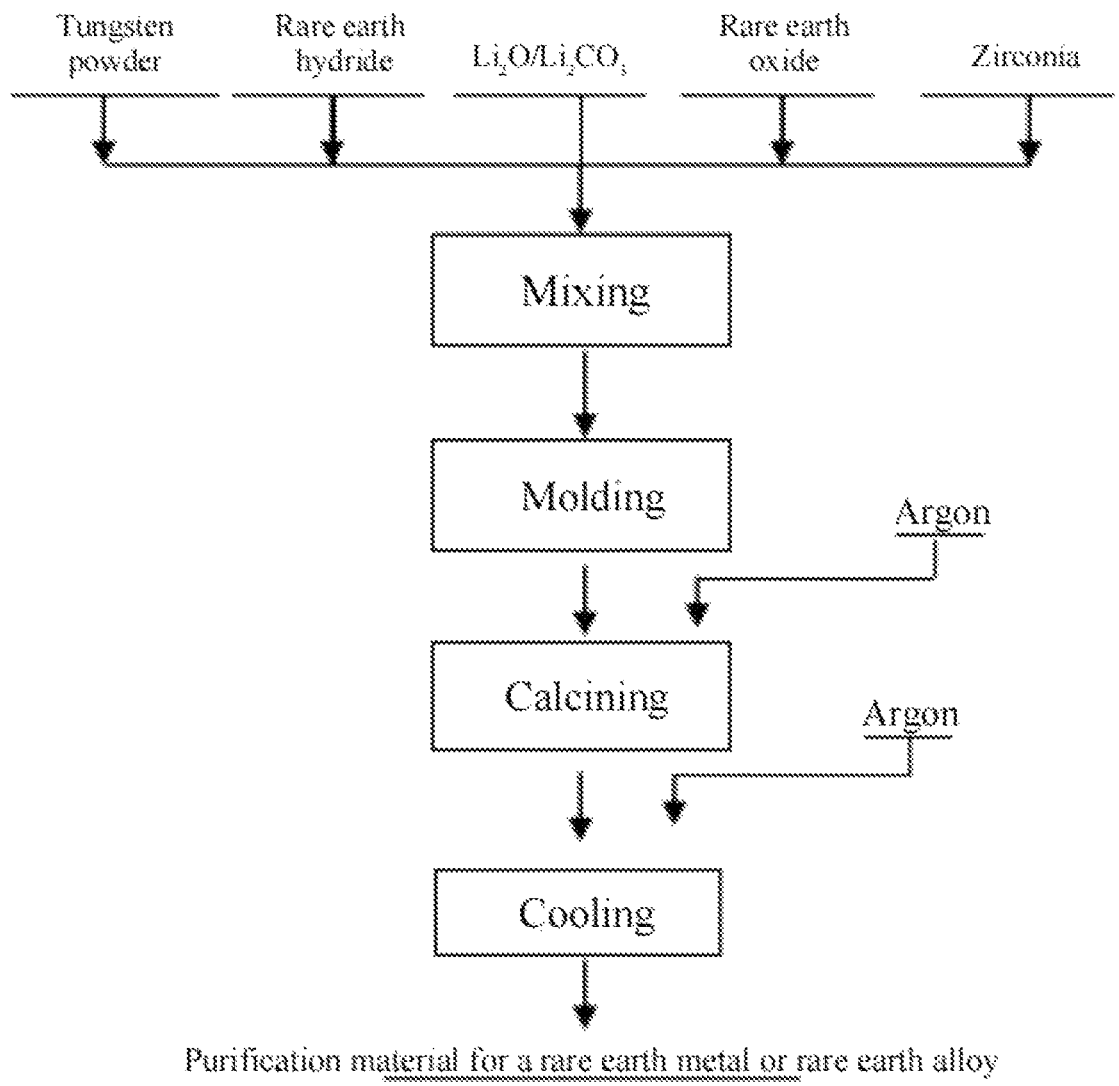
FIG. 1 shows a method for preparing the purification material for a rare earth metal or rare earth alloy.
Figure 2:
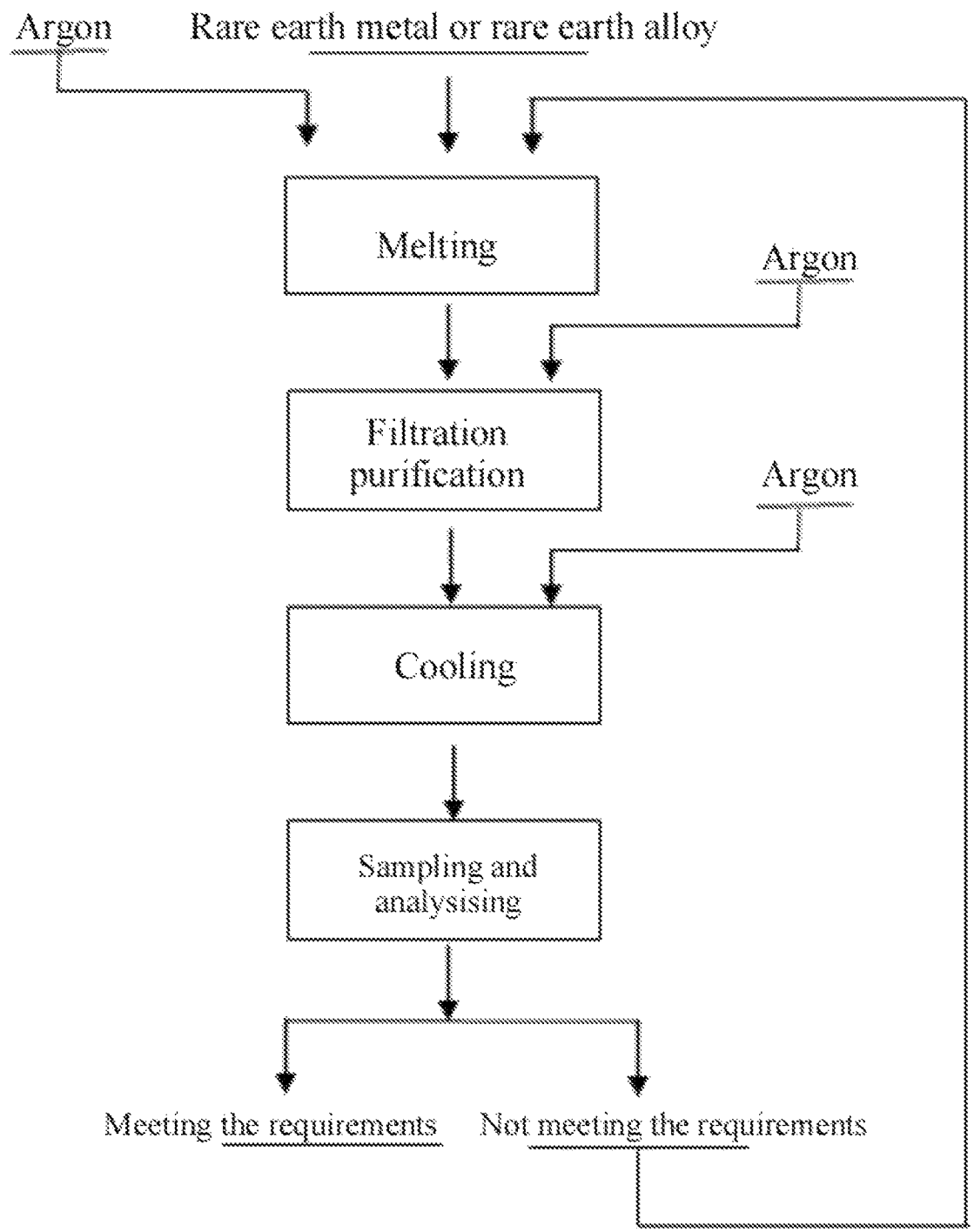
FIG. 2 shows a method for purifying a rare earth metal or rare earth alloy.

The present disclosure provides a purification material for a rare earth metal or rare earth alloy, including the following raw materials in mass percentage:

30% to 45% of a tungsten powder, 30% to 50% of a rare earth oxide, 5% to 10% of zirconia, 10% to 15% of a binder, and 1% to 5% of a rare earth hydride.

In the present disclosure, the purification material for a rare earth metal or rare earth alloy has a porosity of preferably 78% to 82%.

In the present disclosure, the raw materials of the purification material for a rare earth metal or rare earth alloy include the tungsten powder with a mass percentage of 30% to 45%, preferably 35% to 40%. In the present disclosure, the tungsten powder has a purity of preferably greater than or equal to 99%. In the present disclosure, the tungsten powder has a median particle size of preferably 15 μm to 25 μm.

In the present disclosure, the raw materials of the purification material for a rare earth metal or rare earth alloy include the rare earth oxide with a mass percentage of 30% to 50%, preferably 35% to 45% and more preferably 40%. In the present disclosure, the rare earth oxide preferably includes one or more of lanthanum oxide, cerium oxide, praseodymium oxide, neodymium oxide and yttrium oxide, and is more preferably cerium oxide, a mixture of praseodymium oxide-neodymium oxide or yttrium oxide. In the mixture of praseodymium oxide-neodymium oxide, praseodymium oxide has a mass ratio of preferably 1:3. In the present disclosure, the rare earth oxide has a purity of preferably greater than or equal to 99%. In the present disclosure, the rare earth oxide has a median particle size of preferably 5 μm to 20 μm.

In the present disclosure, the raw materials of the purification material for a rare earth metal or rare earth alloy include zirconia with a mass percentage of 5% to 10%, preferably 6% to 9%, and more preferably 7% to 8%. In the present disclosure, zirconia has a purity of preferably greater than or equal to 99%. In the present disclosure, zirconia has a median particle size of preferably 20 μm to 50 μm.

In the present disclosure, the raw materials of the purification material for a rare earth metal or rare earth alloy include the binder with a mass percentage of 10% to 15%, preferably 11% to 14%, and more preferably 12% to 13%. In the present disclosure, the binder is preferably lithium oxide and/or lithium carbonate, and more preferably lithium oxide. In the present disclosure, the binder has a purity of preferably greater than or equal to 99%. In the present disclosure, the binder has a median particle size of preferably 10 μm to 50 μm.

In the present disclosure, the raw materials of the purification material for a rare earth metal or rare earth alloy include the rare earth hydride with a mass percentage of 1% to 5%, preferably 2% to 4%, and more preferably 3%. In the present disclosure, the rare earth hydride preferably includes one or more of lanthanum hydride, cerium hydride, praseodymium hydride, neodymium hydride and yttrium hydride, and is more preferably cerium hydride, a mixture of praseodymium hydride-neo-dymium hydride or yttrium hydride. In the mixture of praseodymium hydride-neodymium hydride, praseodymium hydride has a mass percentage of preferably 20% to 30%, and specifically preferably 20%; neodymium hydride has a mass percentage of preferably 70 to 80%, and specifically preferably 80%. In the present disclosure, the rare earth hydride has a purity of preferably greater than or equal to 99%. In the present disclosure, the rare earth hydride has a median particle size of preferably 20 μm to 80 μm.

The present disclosure further provides a method for preparing the purification material for a rare earth metal or rare earth alloy according to the technical solutions above, including the following steps:

mixing the raw materials and then subjecting to molding and calcining in sequence to obtain the purification material for a rare earth metal or rare earth alloy.

In the present disclosure, the means for mixing the raw materials is not specifically limited, as long as the raw materials can be mixed uniformly.

In the present disclosure, the molding is conducted at a pressure within a range of preferably 10 MPa to 100 MPa, more preferably 30 MPa to 80 MPa and further more preferably 50 MPa to 60 MPa for preferably 30 min to 60 min and more preferably 40 min to 50 min.

In the present disclosure, the calcining is conducted at a temperature within a range of preferably 1,600° C. to 1,800° C., more preferably 1,650° C. to 1,750° C. and further more preferably 1,700° C. for preferably 1 h to 3 h, more preferably 1.5 h to 2.5 h and further more preferably 2 h with a heating rate within a range of preferably 15° C./min to 30° C./min and more preferably 20° C./min to 25° C./min. In the present disclosure, the calcining is preferably conducted in protective atmosphere, and the protective atmosphere includes preferably argon.

In the present disclosure, after the calcining, the method further includes preferably furnace cooling to room temperature. In the present disclosure, the furnace cooling is conducted preferably in a protective atmosphere, and the protective atmosphere includes preferably argon.

The present disclosure further provides a method for purifying a rare earth metal or rare earth alloy, including the following steps:

flowing a rare earth metal or rare earth alloy to be purified through a purification material for filtration purification to obtain a purified rare earth metal or rare earth alloy, where the purification material is the purification material for a rare earth metal or rare earth alloy according to the technical solutions above.

In the present disclosure, the rare earth metal or rare earth alloy to be purified includes an impurity, and the impurity includes preferably electrolytes, rare earth oxides, rare earth carbides, nitrides and sulfides. In the present disclosure, the electrolyte includes preferably a complex of rare earth fluoride-lithium fluoride, and the complex of rare earth fluoride-lithium fluoride preferably includes one or more of $NdF_3$—LiF, $NdF_3$—$PrF_3$—LiF, $HoF_3$—LiF, $DyF_3$—LiF and $GdF_3$—LiF. In the present disclosure, the rare earth oxide includes preferably one or more of neodymium oxide, praseodymium oxide, dysprosium oxide, holmium oxide, gadolinium oxide, lanthanum oxide and cerium oxide. In the present disclosure, the rare earth carbide includes preferably one or more of lanthanum carbide, neodymium carbide, praseodymium carbide, holmium carbide, gadolinium carbide, cerium carbide and dysprosium carbide. In the present disclosure, the nitride includes preferably one or more of lanthanum nitride, neodymium nitride, praseodymium nitride, holmium nitride, gadolinium nitride, cerium nitride and dysprosium nitride. In the present disclosure, the sulfide includes preferably one or more of lanthanum sulfide, neodymium sulfide, praseodymium sulfide, holmium sulfide, gadoli-nium sulfide, cerium sulfide and dysprosium sulfide.

In the present disclosure, the flowing includes preferably: placing the rare earth metal or rare earth alloy to be purified on the purification material.

In the present disclosure, the filtration purification is conducted at a temperature within a range of preferably 900° C. to 1,200° C. and more preferably 1,000° C. to 1,100° C. In the present disclosure, the filtration purification is conducted preferably in a protective atmosphere, and the protective atmosphere includes preferably argon.

In the present disclosure, the filtration purification is conducted preferably in a crucible with a leak opening.

In the present disclosure, when combining with a crucible with a leak opening, the filtration purification is conducted as follows: placing the purification material in the crucible with a leak opening, and placing the rare earth metal or rare earth alloy to be purified on the purification material for the filtration purification. Since the filtration purification is conducted at a high temperature, the purification material maintains a solid state, the rare earth metal or rare earth alloy to be purified is converted into a molten state with fluidity, and the molten-state rare earth metal or rare earth alloy to be purified passes through the purification material to realize the purification of the rare earth metal or rare earth alloy to be purified.

The purification material for a rare earth metal or rare earth alloy and the preparation method thereof and the purification method fora rare earth metal or rare earth alloy provided in the present disclosure will be described in detail below in connection with the examples. However, the examples should not be construed as limiting the claimed scope of the present disclosure.

Example 1

300 g of a tungsten powder with a purity of more than 99% (D50 of 20 μm), 50 g of zirconia with a purity of more than 99% (D50 of 40 μm), 400 g of cerium oxide with a purity of more than 99% (D50 of 12 μm), 85 g of lithium oxide with a purity of more than 99% (D50 of 10 μm), and 15 g of a rare earth hydride with a purity greater than 99% ($CeH_2$, D50 of 25 μm) were added to a mold of DN500 mm, molded at 50 MPa for 35 min, then calcined at 1,700° C. for 1 h with a heating rate of 15° C./min in an atmosphere calcining furnace under argon protection, and finally furnace cooled to room temperature under nitrogen protection to obtain a purification material.

A porosity of the purification material obtained was tested according to GB/T21650.3-2011, and the porosity was 80%.

The purification material was placed in a crucible with a leak opening. Then a cerium metal produced by molten salt electrolysis was placed on the purification material and heated to 1,000° C. under argon protection for filtration purification. The filtration purification was conducted 2 times.

Table 1 shows the contents of main impurities in the cerium metal before and after filtration purification.

TABLE 1

| Main impurity contents (ppm) in cerium metal before and after filtration purification | | | | | |
|---|---|---|---|---|---|
| | Carbide | Oxide | Fluoride | Fe | Nitride | Sulfide |
| Before filtration | 600 | 560 | 86 | 1500 | 15 | 12 |
| After filtration | 240 | 300 | 20 | 800 | 5 | 6 |

It may be seen from Table 1 that the carbides in the cerium metal are reduced to 300 ppm or less, which meets the industry requirements, and the oxides are reduced to 300 ppm. Meanwhile, the electrolyte fluoride inclusions are reduced to 20 ppm, and the content of iron is reduced to 800 ppm. The nitrides and sulfides are adsorbed and filtered, and the rare earth metal is purified.

Example 2

380 g of a tungsten powder with a purity of more than 99% (D50 of 25 μm), 60 g of zirconia with a purity of more than 99% (D50 of 40 μm), 320 g of rare earth oxides with a purity of more than 99% (a mixture of praseodymium oxide and neodymium oxide in a mass ratio of 1:3, D50 of 8 μm), 95 g of lithium oxide with a purity of more than 99% (D50 of 30 μm), and 20 g of rare earth hydrides with a purity greater than 99% (a mixture of $PrH_2$ and $NdH_2$ in a mass ratio of 1:4, D50 of 35 μm) were added to a mold of DN500 mm, molded at 50 MPa for 40 min, then calcined at 1,600° C. for 3 h with heating rate of 15° C./min in an atmosphere calcining furnace under argon protection, and finally furnace cooled to room temperature under nitrogen protection to obtain a purification material.

A porosity of the purification material obtained was tested according to GB/T21650.3-2011, and the porosity was 78%.

The purification material was placed in a crucible with a leak opening. Then a neodymium metal produced by molten salt electrolysis was placed on the purification material and heated to 1,100° C. under argon protection for filtration purification. The filtration purification was conducted 3 times.

Table 2 shows the contents of main impurities in the neodymium metal before and after filtration purification.

TABLE 2

| Main impurity contents (ppm) in neodymium metal before and after filtration purification | | | | | |
|---|---|---|---|---|---|
| | Carbide | Oxide | Fluoride | Fe | Nitride | Sulfide |
| Before filtration | 640 | 620 | 110 | 1300 | 12 | 10 |
| After filtration | 120 | 240 | 40 | 310 | 4 | 3 |

It may be seen from Table 2 that the carbides in the neodymium metal are reduced to 300 ppm or less, meeting the industry requirements, and the oxides are reduced to 240 ppm. Meanwhile, the electrolyte fluoride inclusions are reduced to 40 ppm, and the content of iron is reduced to 310 ppm. The nitrides and sulfides are adsorbed and filtered, and the rare earth metal is purified.

Example 3

350 g of a tungsten powder with a purity of more than 99% (D50 of 20 μm), 65 g of zirconia with a purity of more than 99% (D50 of 30 μm), 350 g of yttrium oxide with a purity of more than 99% (D50 of 5 μm), 108 g of lithium oxide with a purity of more than 99% (D50 of 25 μm), and 25 g of a rare earth hydride with a purity greater than 99% ($YH_2$, D50 of 40 μm) were added to a mold of DN500 mm, molded at 50 MPa pressure for 60 min, then calcined at 1,800° C. for 2 h with a heating rate of 15° C./min in an atmosphere calcining furnace under argon protection, and finally furnace cooled to room temperature under nitrogen protection to obtain a purification material.

A porosity of the purification material obtained was tested according to GB/T21650.3-2011, and the porosity was 82%.

The purification material was placed in a crucible with a leak opening. Then a neodymium metal produced by molten salt electrolysis was placed on the purification material and heated to 1,150° C. under argon protection for filtration purification. The filtration purification was conducted 4 times.

Table 3 shows the contents of main impurities in the neodymium metal before and after filtration purification.

TABLE 3

Main impurity contents (ppm) in neodymium metal before and after filtration purification

| | Carbide | Oxide | Fluoride | Fe | Nitride | Sulfide |
|---|---|---|---|---|---|---|
| Before filtration | 840 | 160 | 100 | 1700 | 10 | 11 |
| After filtration | 130 | 70 | 40 | 880 | 3 | 4 |

It may be seen from Table 3 that the carbides in the neodymium metal are reduced to 300 ppm or less, meeting the industry requirements, and the oxides are reduced to 70 ppm. Meanwhile, the electrolyte fluoride inclusions are reduced to 40 ppm, and the content of iron is reduced to 880 ppm. The nitrides and sulfides are adsorbed and filtered, and the rare earth metal is purified.

Example 4

380 g of a tungsten powder with a purity of more than 99% (D50 of 25 μm), 60 g of zirconia with a purity of more than 99% (D50 of 40 μm), 320 g of rare earth oxides with a purity of more than 99% (a mixture of praseodymium oxide and neodymium oxide in a mass ratio of 1:3, D50 of 8 μm), 105 g of lithium oxide with a purity of more than 99% (D50 of 30 μm), and 25 g of rare earth hydrides with a purity greater than 99% (a mixture of $PrH_2$ and $NdH_2$ in a mass ratio of 1:4, D50 of 35 μm) were added to a mold of DN500 mm, molded at 50 MPa for 40 min, then calcined at 1,600° C. for 3 h with a heating rate of 15° C./min in an atmosphere calcining furnace under argon protection, and finally furnace cooled to room temperature under nitrogen protection to obtain a purification material.

A porosity of the purification material obtained was tested according to GB/T21650. 3-2011, and the porosity was 78%.

The purification material was placed in a crucible with a leak opening. Subsequently, a praseodymium-neodymium alloy produced by molten salt electrolysis was placed on the purification material and heated to 1,150° C. under argon protection for filtration purification. The filtration purification was conducted 2 times.

Table 4 shows the contents of main impurities in the praseodymium-neodymium alloy before and after filtration purification.

TABLE 4

Main impurity contents (ppm) in praseodymium-neodymium alloy before and after filtration purification

| | Carbide | Oxide | Fluoride | Fe | Nitride | Sulfide |
|---|---|---|---|---|---|---|
| Before filtration | 830 | 580 | 150 | 1460 | 15 | 12 |
| After filtration | 140 | 320 | 60 | 540 | 5 | 4 |

It may be seen from Table 4 that the carbides in the praseodymium-neodymium alloy are reduced to 300 ppm or less, meeting the industry requirements, and the oxides are reduced to 320 ppm. Meanwhile, the electrolyte fluoride inclusions are reduced to 60 ppm, and the content of iron is reduced to 540 ppm. The nitrides and sulfides are adsorbed and filtered, and the rare earth metal is purified.

The above descriptions are merely the preferred implementations of the present disclosure. It should be noted that a person of ordinary skill in the art may further make several improvements and modifications without departing from the principle of the present disclosure, and such improvements and modifications should be deemed as falling within the protection scope of the present disclosure.

What is claimed is:

1. A method for purifying a rare earth metal or rare earth alloy, comprising:
    flowing a rare earth metal or rare earth alloy to be purified through a purification material for filtration purification to obtain a purified rare earth metal or rare earth alloy, wherein the purification material is a purification material for a rare earth metal or rare earth alloy, which comprises the following raw materials in mass percentage: 30% to 45% of a tungsten powder, 30% to 50% of a rare earth oxide, 5% to 10% of zirconia, 10% to 15% of a binder, and 1% to 5% of a rare earth hydride.

2. The method according to claim 1, wherein the filtration purification is conducted 1 to 5 times.

3. The method according to claim 1, wherein the filtration purification is conducted at a temperature within a range of 900° C. to 1,200° C. in a protective atmosphere.

4. The method according to claim 1, wherein the binder is lithium oxide and/or lithium carbonate.

5. The method according to claim 1, wherein the rare earth oxide comprises one or more selected from the group consisting of lanthanum oxide, cerium oxide, praseodymium oxide, neodymium oxide and yttrium oxide.

6. The method according to claim 1, wherein the rare earth hydride comprises one or more selected from the group consisting of lanthanum hydride, cerium hydride, praseodymium hydride, neodymium hydride and yttrium hydride.

7. The method according to claim 1, wherein a method for preparing the purification material for a rare earth metal or rare earth alloy comprises:

mixing the raw materials and then subjecting to molding and calcining in sequence to obtain the purification material for a rare earth metal or rare earth alloy.

8. The method according to claim 7, wherein the molding is conducted at a pressure within a range of 10 MPa to 100 MPa for 30 min to 60 min.

9. The method according to claim 7, wherein the calcining is conducted at a temperature within a range of 1,600° C. to 1,800° C. for 1 h to 3 h in a protective atmosphere with a heating rate within a range of 15° C./min to 30° C./min.

* * * * *